United States Patent
Bushre

(10) Patent No.: US 10,400,975 B1
(45) Date of Patent: Sep. 3, 2019

(54) AUTOMOTIVE LAMP WITH ELONGATED ASPHERICAL LENS

(71) Applicant: Adam Bushre, Saranac, MI (US)

(72) Inventor: Adam Bushre, Saranac, MI (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 16/014,464

(22) Filed: Jun. 21, 2018

(51) Int. Cl.
  *B60Q 1/24* (2006.01)
  *F21S 41/26* (2018.01)
  *B60R 11/04* (2006.01)
  *F21S 41/143* (2018.01)

(52) U.S. Cl.
  CPC ........... *F21S 41/26* (2018.01); *B60Q 1/24* (2013.01); *B60R 11/04* (2013.01); *F21S 41/143* (2018.01)

(58) Field of Classification Search
  CPC ......... F21S 41/26; F21S 41/143; B60R 11/04; B60Q 1/24
  See application file for complete search history.

(56) References Cited

U.S. PATENT DOCUMENTS

| | | | |
|---|---|---|---|
| 6,690,268 B2 * | 2/2004 | Schofield | B60C 23/00 340/438 |
| 7,993,035 B2 | 8/2011 | Shih et al. | |
| 8,545,072 B2 | 10/2013 | Rice et al. | |
| 9,731,653 B2 | 8/2017 | Lynam | |
| 2009/0207586 A1 * | 8/2009 | Arai | G02B 5/021 362/97.1 |
| 2016/0040860 A1 * | 2/2016 | Thomas | A47F 3/001 362/92 |
| 2017/0138558 A1 | 5/2017 | Timinger | |
| 2017/0190282 A1 * | 7/2017 | Salter | B60Q 1/323 |
| 2017/0238277 A1 * | 8/2017 | Irgang | B60Q 1/0094 362/516 |
| 2017/0246985 A1 * | 8/2017 | Dellock | B60Q 1/2619 |

\* cited by examiner

*Primary Examiner* — Donald L Raleigh
(74) *Attorney, Agent, or Firm* — Edward S. Podszus

(57) ABSTRACT

Automotive lamp (10), preferably a backup lamp, includes first lamp (12) and plural LEDs (26a-n). The lamp (12) comprises light-transmissive material, first and second opposed end surfaces (16, 18), a source side (20) and an emission side (22) each extending between end surfaces (16, 18), source side (20) facing LEDs (26a-n), and emission side (22) having an aspherical surface facing area to be illuminated (24). The elongated optical lens (14) has a length (L) extending, parallel a first horizontal X-axis, between the end surfaces (16, 18) that is greater than a thickness along second horizontal Z-axis and a height along vertical Y-axis (X-, Y-, and Z-axes being mutually orthogonal). Elongated optical lens (14) defines focus line segment (FS) extending parallel the X-axis, and preferably bends LED light below a horizontal XZ plane, i.e. back towards source side (20). Backup lamp (12) provides to camera (52) ground illumination of minimum 1 lux at distances 0-6 meter when mounted to vehicle at heights between conventional bumper and roofline.

20 Claims, 14 Drawing Sheets

US 10,400,975 B1

AUTOMOTIVE LAMP WITH ELONGATED ASPHERICAL LENS

STATEMENT REGARDING FEDERALLY SPONSORED RESEARCH OR DEVELOPMENT

N/A

TECHNICAL FIELD

Automotive lamps, more particularly rear backup lamps and rear fog lamps including an elongated aspherical optical lens and a plurality of light emitting diodes (LEDs).

BACKGROUND

Lighting systems may use one or more optical lenses to direct light from a light source in a particular direction. Such lighting systems are used in a variety of light applications including rear backup lamps and rear fog lamps for motor vehicles. Many lighting systems are subject to regulations which govern, inter alia, installation requirements, test procedures, design guidelines, and performance requirements. Such regulations for backup lamps include, but are not limited to, regulations described in Department of Transportation (DOT) 49 C.F.R. § 571.108 (Transportation) as well as SAE Standard J593 (rev June 2016) published by SAE International. Such regulations for rear fog lamps include, but are not limited to, regulations described in ECE Regulation No. 38-00 entitled "Uniform Provisions Concerning the Approval of: Rear Fog Lamps for Power-driven Vehicles and their Trailers" issued by the United Nations Economic Commission for Europe (UN-ECE), published by InterRegs (website interregs.com).

U.S. Pat. No. 7,993,035 (Shih) discloses a transparent, aspherical LED angular optical lens for generating a narrow distribution pattern and an LED assembly using the same. It is the understanding of the person of ordinary skill in the art that the assembly of the Shih Pat. '035 uses only a single LED (11), not a plurality of LEDs, and that the lens is not an elongated lens, but rather a hemispherical lens (13), see its FIG. 2. In addition, the person of ordinary skill in the art understands that in the assembly of the Shih Pat. '035 that the single LED is coupled to the lens using a seal gel (12). The use of a seal gel between the LED and the lens increases the number of components and increases the complexity of manufacture, thus increasing the overall cost of the assembly. Another example of optics is described in U.S. Pub. No. US 2017/0138558 (Timinger). A vehicle rear backup camera is described in U.S. Pat. No. 9,731,653 (Lynam).

BRIEF DESCRIPTION OF THE DRAWINGS

Reference should be made to the following detailed description which should be read in conjunction with the following figures, wherein like numerals represent like parts.

DETAILED DESCRIPTION OF A PREFERRED EMBODIMENT

In general, one embodiment of the present disclosure features an automotive lamp. The automotive lamp may include one or more lamps (e.g., a first and a second lamp) and may be useful as a rear backup lamp and/or a rear fog light. Each lamp includes an elongated optical lens and a plurality of light emitting diodes (LEDs). The elongated optical lens comprises a light transmissive material, a first and a second end surface, a source side extending between the first and second end surfaces and facing the plurality of LEDs, and an emission side having an aspherical surface extending between the first and second end surfaces and facing an area to be illuminated. The elongated optical lens further comprises a length extending between the first and second end surfaces which is parallel to a first horizontal X-axis, a thickness in a second horizontal Z-axis, and a height in a vertical Y-axis (the X-axis, Y-axis, and Z-axis being orthogonal to each other). The length of the elongated optical lens is greater than both the thickness and the height of the elongated optical lens and the elongated optical lens is configured to define a plurality of foci extending in a focus line which is parallel to the X-axis.

An automotive lamp consistent with at least one embodiment of the present disclosure allows for an extremely small footprint which may be used to illuminate various regions, e.g., but not limited to, the field of view of a back-up camera and/or a rear fog lamp illumination region. One advantage of the automotive lamp is that it may have an extremely small optical lens (e.g., 10 mm or less in height, 50 mm or less in length, and 6.9 mm in depth). Due to the small size, the automotive lamp may be easily mounted to the rear of a vehicle at a variety of locations including, but not limited to, at mounting heights ranging from 370 mm (approximately bumper level) to 1.2 m (e.g., near roofline level for a tall SUV), while still providing sufficient luminous flux (e.g., for a rear view camera).

Another advantage of the automotive lamp is that it made may be inexpensively manufactured. The elongated optical lens may include an aspherical collimator which may be formed by extrusion of a transparent plastic (such as, but not limited to, poly(methyl methacrylate) (PMMA)). In addition, the automotive lamp may use only two or three LEDs, thereby reducing the manufacturing costs (though it should be appreciated that the automotive lamp may use more than three LEDs depending on the intended application).

Figure 1:
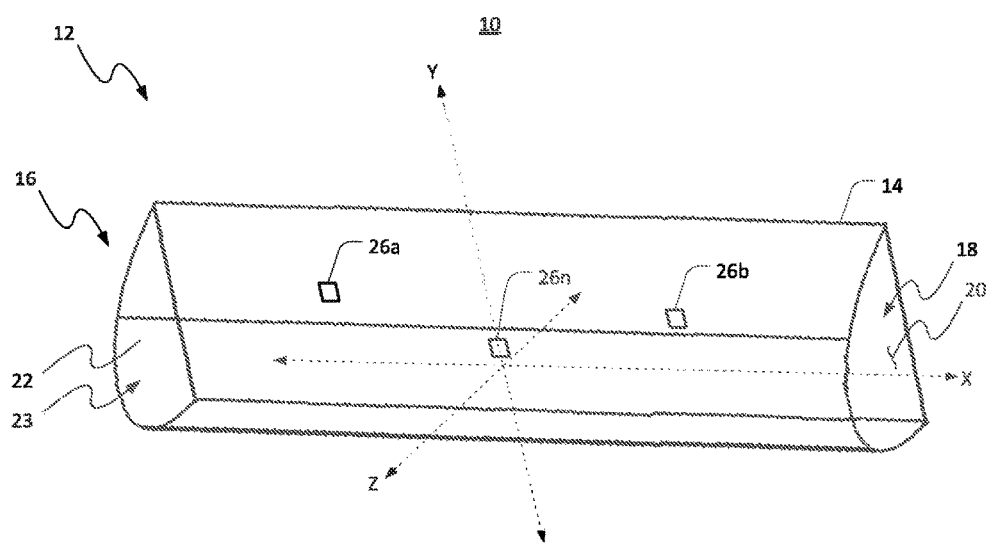
FIG. 1 is a perspective view of an automotive lamp consistent with at least one embodiment of the present disclosure.
Figure 2:
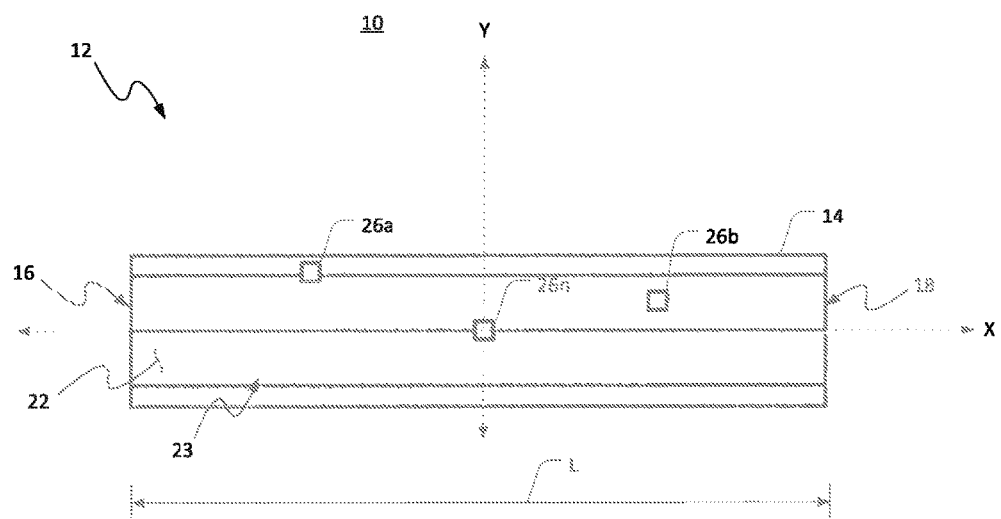
FIG. 2 is a front view of the lamp of FIG. 1.
Figure 3:
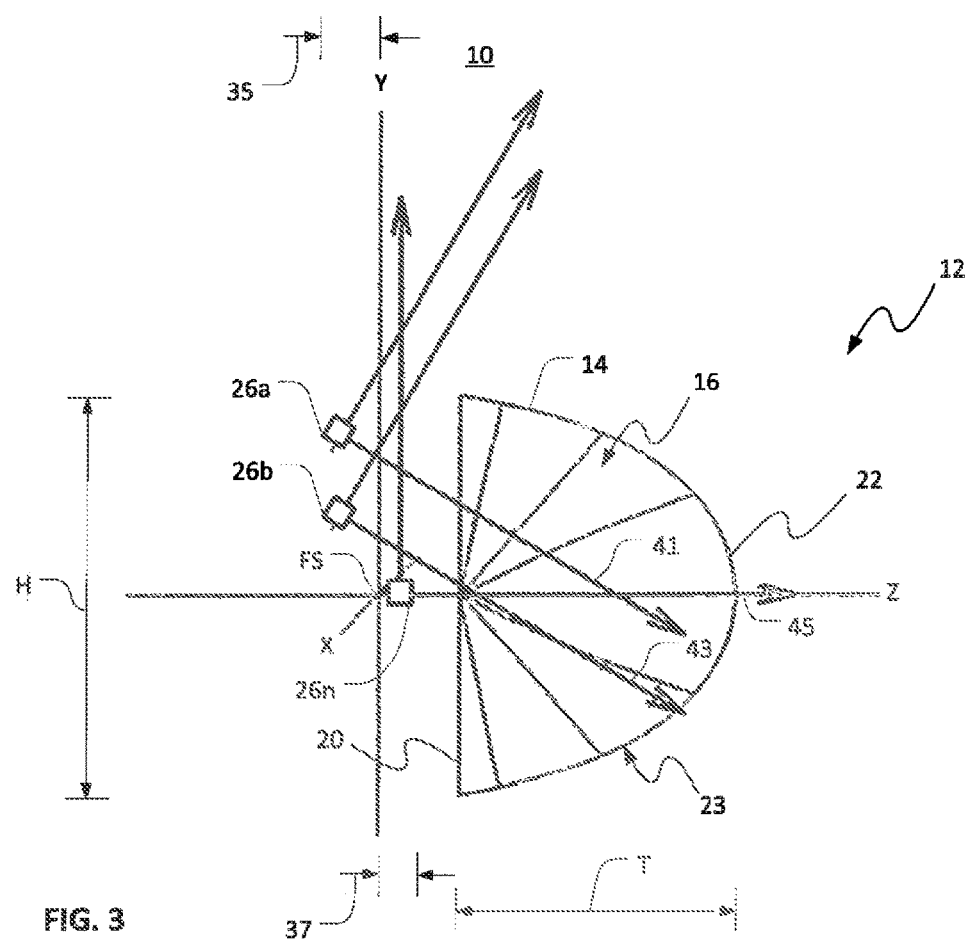
FIG. 3 is a side view of the lamp of FIG. 1.

Turning now to FIGS. 1-3, one embodiment of an automotive lamp 10 consistent with the present disclosure is generally illustrated. In particular, FIG. 1 is a perspective view, FIG. 2 is a front view, and FIG. 3 is a side view of the automotive lamp 10. The automotive lamp 10 includes at least a one lamp 12 and may be particularly suited for use as a backup lamp. The lamp 12 includes an elongated optical lens 14 and a plurality of light emitting diodes (LEDs) 26a-n. Each of the plurality of LEDs 26a-n is configured to emit light in a generally Lambertian emission pattern. One or more of the LEDs 26a-n may be configured to emit light in the visible spectrum and/or infrared spectrum. While the lamp 12 is shown with three LEDs 26a-n, it should be appreciated that the lamp 12 may include only two LEDs 26a-n or more than three LEDs 26a-n depending on the application.

Figure 6:
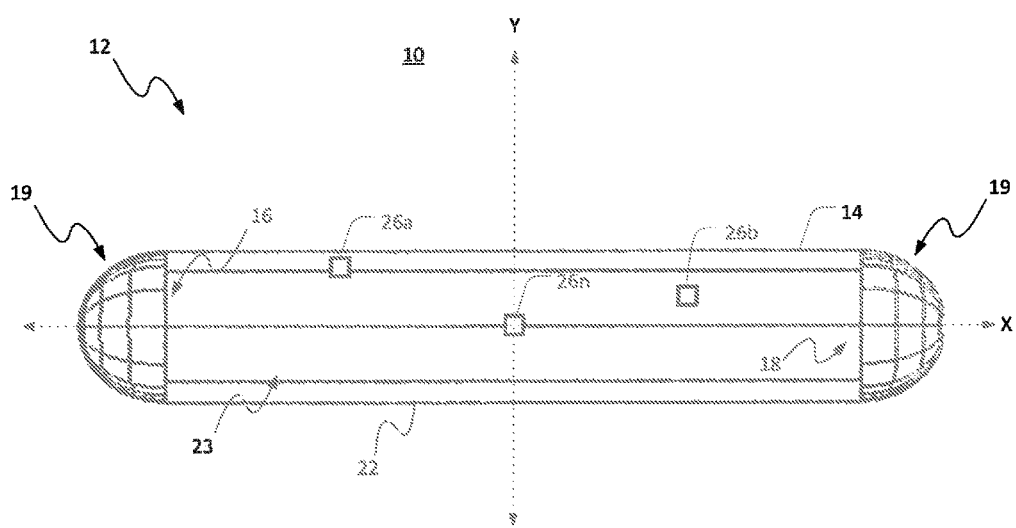
FIG. 6 is a front view of another automotive lamp embodiment including end caps.

The elongated optical lens 14 is formed from a light transmissive material and includes a first end surface 16, a second end surface 18, a source side 20, and an emission side 22 having an aspherical surface 23. The elongated optical lens 14 may optionally include an end cap 19 extending from the first and/or second end surfaces 16, 18, for example, as generally illustrated in FIG. 6. The end caps 19 may be generally hemispherical in the front view and conform to the aspherical surface 23.

Referring back to FIGS. 1-3, the light transmissive material may include any material having a refractive index (n) in the range of 1.4 to 1.6. Non-limiting examples of the light transmissive material include poly(methyl methacrylate) (PMMA), glass, polycarbonate, and silicon. The elongated optical lens 14 has a length L, FIG. 2, which extends between the first end surface 16 and the second end surface 18 and is parallel to a first horizontal X-axis. The elongated optical lens 14 may also have a thickness T, FIG. 3, in a second horizontal Z-axis and a height H in a vertical Y-axis. As can be seen, the X-axis is orthogonal to the Z-axis and the Y-axis is orthogonal to both the X-axis and the Z-axis. The length L of the elongated optical lens 14 is greater than both the thickness T and the height H of the elongated optical lens 14.

The source side 20 faces the plurality of LEDs 26a-n and extends between the first end surface 16 and the second end surface 18. Optionally, the plurality of LEDs 26a-n may be separated from the source side 20 by air. In the illustrated embodiment the source side 20 is planar; however, it should be appreciated that the source side 20 may be nonplanar. For example, the source side 20 may include convex, concaved, and/or aspherical surfaces.

Figure 4:
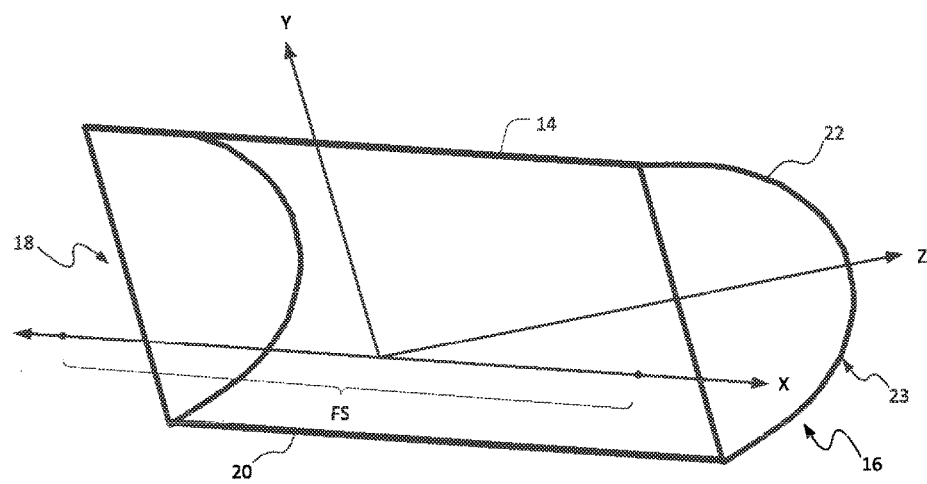
FIG. 4 is a perspective view of an embodiment of the optical lens of FIG. 1.

The emission side 22 has an aspherical surface 23 extending between the first end surface 16 and the second end surface 18 and faces an area to be illuminated. Because the emission side 22 has an aspherical surface 23 which extends between the first end surface 16 and the second end surface 18, the elongated optical lens 14, FIG. 4 (shown without the LEDs 26a-n for clarity), defines a focus line segment FS, which extends parallel to the X-axis. In the illustrated embodiments, the focus line segment FS is a portion of the X-axis with its center disposed at the origin of the Cartesian coordinate system.

The plurality of LEDs 26a-n face the source side 20 and are spaced longitudinally along the source side 20 such that light, preferably white light, emitted from the plurality of LEDs 26a-n is received at the source side 20 and is bent as it passes through the elongated optical lens 14 and exits the emission side 22 such that the light provides a desired luminous flux in a desired illumination field. The luminous flux and the desired illumination field may be adjusted by varying the position of the plurality of LEDs 26a-n relative to the elongated optical lens 14, by adjusting the refractive index (n) of the elongated optical lens 14, and/or adjusting the surface profile of the aspherical surface 23 of the emission side 22.

Figure 5:
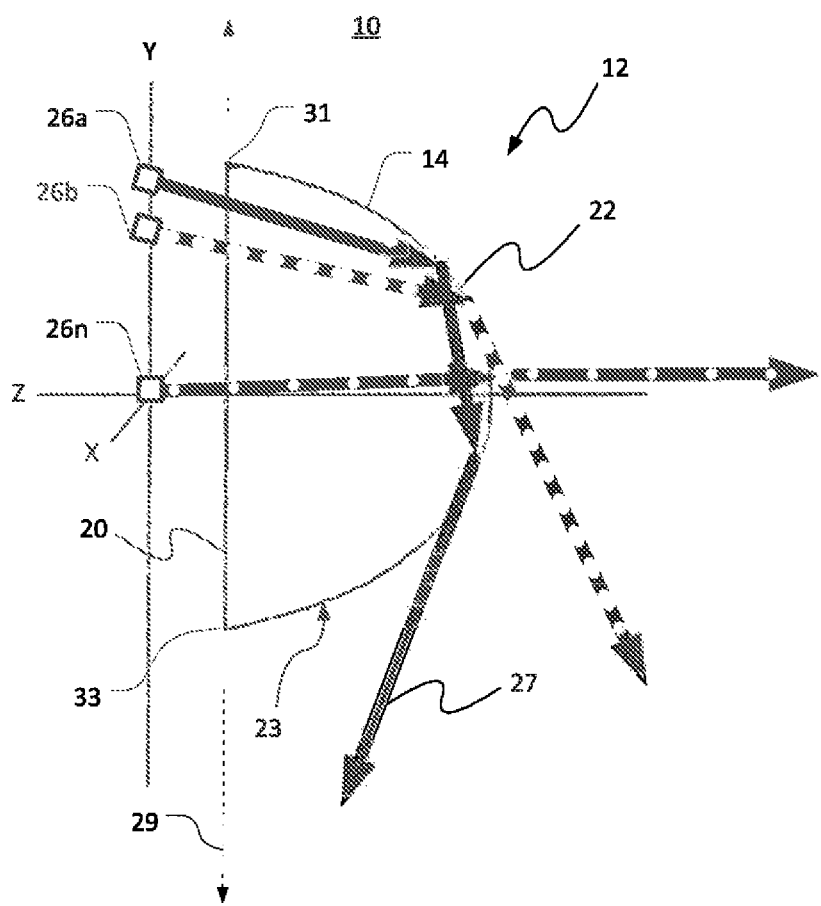
FIG. 5 is a side view of the lamp of FIG. 1 with exemplary ray traces.

One example illustrating a ray tracing from a plurality of LEDs 26a-n through the elongated optical lens 14 is generally illustrated in FIG. 5. As may be seen, the elongated optical lens 14 may be configured to bend at least a portion of light emitted by the plurality of LEDs 26a-n (e.g., as generally illustrated by ray trace 27) at an angle greater than 90 degrees below an XZ plane defined by the X-axis and Z-axis. For example, the elongated optical lens 14 may be configured to bend at least a portion of light emitted by the plurality of LEDs 26a-n (e.g., a generally illustrated by ray trace 27) below an XZ plane generally towards the Y-axis. Put another way, the elongated optical lens 14 may be configured to bend at least a portion of light emitted by the plurality of LEDs 26a-n (e.g., a generally illustrated by ray trace 27) generally downward towards a plane 29 defined by an upper 31 and a lower edge 33 of the source side 20.

As discussed above, the number of LEDs 26a-n, the placement of the LEDs 26a-n relative to the elongated optical lens 14, and the size and shape of the elongated optical lens 14 (e.g., the contours of the source side 20 and/or the aspherical surface 23 of the emission side 22) will impact the illumination pattern generated by the automotive lamp 10 and will depend on the intended application. According to one embodiment, the plurality of LEDs 26a-n comprises a first LED 26a proximate the first end 16 of the elongated optical lens 14 and a second LED 26b proximate the second end 18 of the elongated optical lens 14, and a third LED 26n disposed between the first and the second LED 26a, 26b. The first LED 26a, the second LED 26b, and the third LED 26n may be disposed at different positions along the Y-axis of the first lamp 12, for example, as generally illustrated in FIGS. 1-2. The first LED 26a and the second LED 26b may be disposed above the XZ plane defined by the X-axis and Z-axis as generally illustrated in FIGS. 1-2. The first LED 26a and the second LED 26b may both be disposed along the Z-axis of the first lamp 12 at a first distance 35 from the focus line segment FS as generally illustrated in FIG. 3, while the third LED 26n may be disposed along the Z-axis at a second distance 37 from the focus line segment FS. As may be seen, the second distance is different than the first distance. For example, the third LED 26n may be positioned closer to the focus line segment FS than the first and the second LED 26a, 26b. The principal emission axis 41, 43 of the generally Lambertian radiation pattern for each of the first and the second LEDs 26a, 26b may be directed at a downward angle relative to the Z-axis of the first lamp 12 as generally illustrated in FIG. 3. In addition, the principal emission axis 45 of the generally Lambertian radiation pattern of the third LED 26n may be disposed parallel to the Z-axis.

Figure 7:
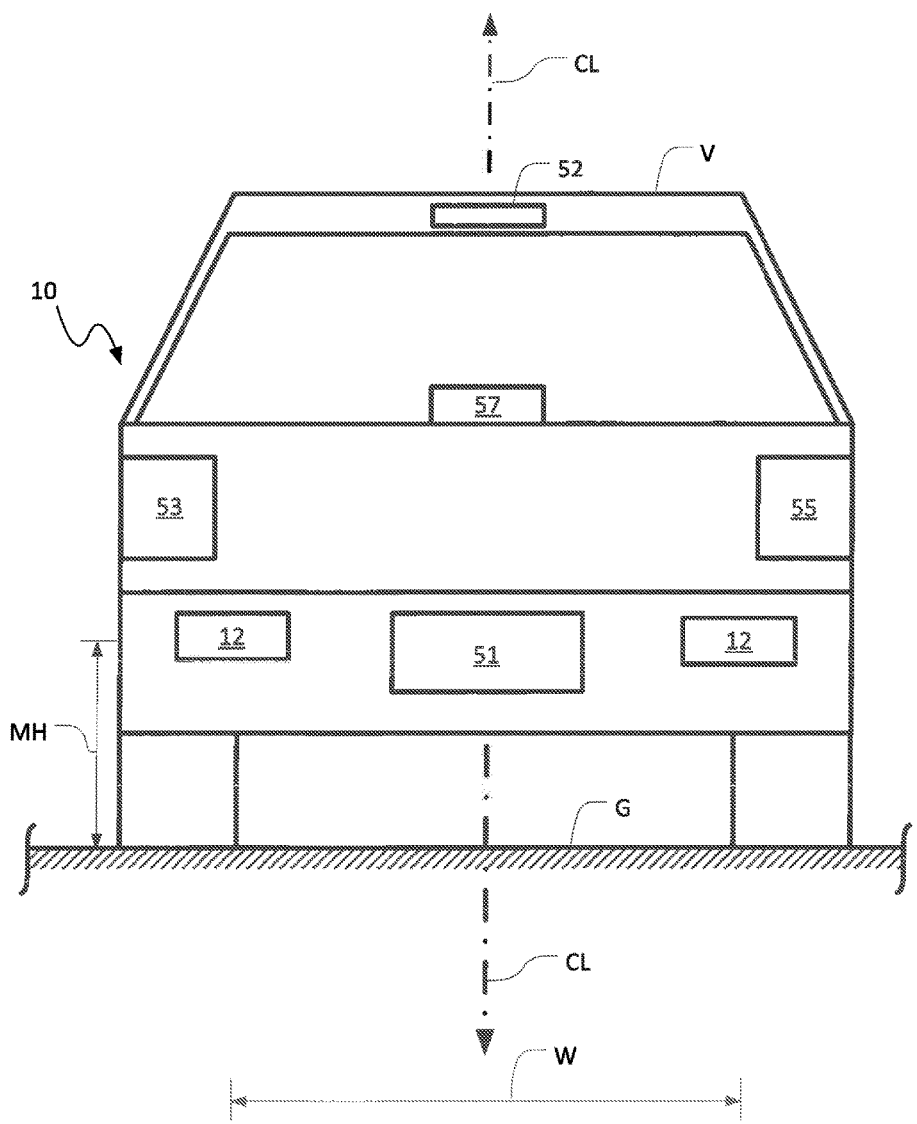
FIG. 7 is a rear view of two lamps of FIG. 6 mounted to the rear of a vehicle V.

Turning to FIG. 7, one embodiment of two lamps 12 consistent with FIG. 6 of the present disclosure mounted to the rear of a vehicle V is generally illustrated. The rear of the vehicle V includes a license plate 51, left and right rear brake lights 53, 55, a third (center) brake light 57, and optionally a backup camera 52. The lamps 12 may be mounted to the vehicle V standing on the horizontal ground G at a vertical mounting height MH from the horizontal ground G in the range of 371 mm to 1200 mm, with the lamps 12 centered with respect to the vehicle centerline CL and horizontally spaced apart from each other at a distance W of 1,750 mm (i.e., each lamp 12 at 875 mm from the vehicle centerline CL).

By way of a non-limiting example, simulations were performed on the automotive lamp 10 of FIG. 7, wherein each lamp 12 included an elongated optical lens 14 having a length L of 50 mm, a thickness T of 6.92 mm, and a height H of 10 mm. Each elongated optical lens 14 was constructed of extruded acrylic (PMMA having a refractive index (n) of 1.489) with fixed end surfaces 16, 18, an upright slope for the source side 20, and a total focal length of 2 mm. The aspherical surface 23 of the emission side 22 had a surface profile in the Z axis as a function of the Y axis characterized by the following polynomial equation (1):

$$Z=-0.0003Y^6-4E\text{-}06Y^5+0.0302Y^4+6E\text{-}05Y^3-0.1847Y^2+0.0002Y+8.957 \quad (1)$$

Each lamp 12 included three Lambertian LEDs 26a, 26b, 26n spaced 10 mm apart horizontally (e.g., parallel to the Z-axis) and centered around the third LED 26n (i.e., the locations of the three LEDs 26a, 26b, 26n along the X-axis were as follows: first LED 26a=-10 mm, second LED 26b=10 mm, and third LED 26n=on axis (i.e., X=0)). The first and second LEDS 26a, 26b were aligned such that the principal emission axes 41, 43 of the generally Lambertian radiation pattern was angled downward at a 30 degree angle relative to the Z-axis (e.g., at a 30 degree angle extending below the XZ plane as generally illustrated in FIG. 3) while the principal emission axis 45 of the third LED 26n was parallel to the Z-axis). The vertical locations of the LEDs 26a, 26b, 26n (i.e., the location of the three LEDs 26a, 26b, 26n along the Y-axis) were as follows: LED 26a=4 mm, LED 26b=2 mm, and LED 26n=on axis (i.e., Y=0). The three LEDs 26a, 26b, 26n were arranged relative to the Z-axis as follows: the first and second LEDs 26a, 26b were located −1 mm from the focus line segment FS and the third LED 26n was located +0.5 mm from the focus line segment FS (the focus line segment FS being a portion of and located within the X-axis). The three LEDs 26a, 26b, 26n were OSLON® Compact LEDs (commercially available from OSRAM Opto Semiconductors®), each operating at 140 lm (depowered from binning current).

Figure 8:
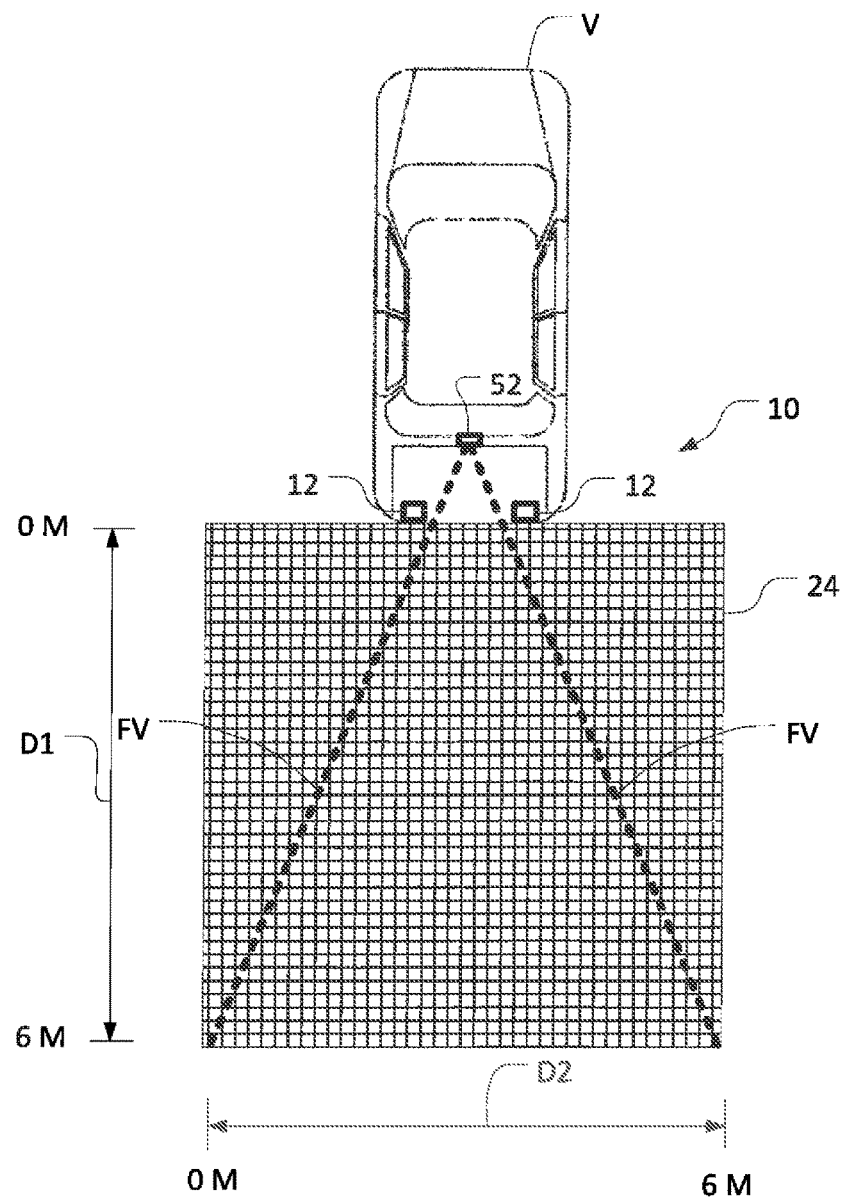
FIG. 8 diagrammatically illustrates photometry simulations of the road illumination for an automotive lamp consistent with FIG. 7.

Turning to FIG. 8, photometry simulations of the road illumination (e.g., the illuminated area) 24 for an automotive lamp 10 consistent with FIG. 7 were performed. The simulations were performed using LucidShape™ simulation software (commercially available from Synopsys™) as well as SolidWorks™ software (commercially available from Dassault Systemes). The photometry simulations showed that each of the lamps 12 provided a ground illumination along the horizontal ground G of at least 1 lux at a distance D1 from 0 m to 6 m from the lamps 12 (i.e., from 0 m to 6 m behind the vehicle V) when the lamps 12 were mounted to the vehicle V at a mounting height MH in the range of 371 mm to 1200 mm. In addition, simulations showed that the two lamps 12 provided a ground illumination along the horizontal ground G behind the vehicle V at a distance D2 of at least 6 m total width on the horizontal ground G when the lamps 12 were mounted to the vehicle V at a spacing W of 1,750 mm from each other. As can be seen, the area 24 behind the vehicle V illuminated by the lamps 12 includes at least a portion of a field of view FV of the video camera 52. It should be appreciated that while the field of view FV of the video camera 52 is illustrated having a generally conical shape, the field of view FV of the video camera 52 may vary from the illustrated shape depending on, inter alia, the mounting height of the video camera 52 as well as the contours of the lens associated with the video camera 52.

It should be appreciated that the dimensions of the elongated optical lens 14 and the arrangement of the LEDs 26a-n relative to the elongated optical lens 14 may be changed without departing from the present disclosure. For example, simulations were also performed with an elongated optical lens 14 having a length L of 35 mm, a thickness T of 6.92 mm, and a height H of 10 mm.

Figure 9:
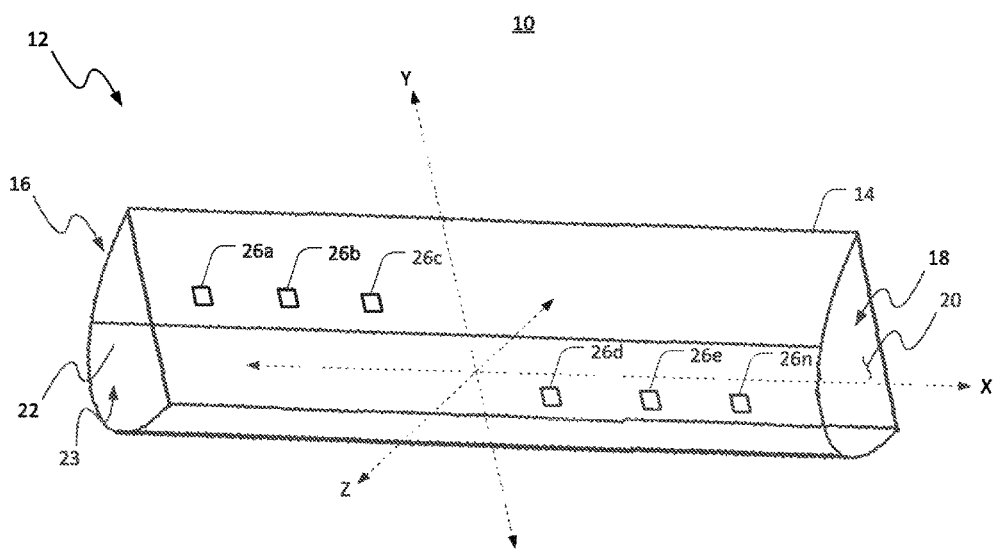
FIG. 9 is a perspective view of one embodiment of a rear fog lamp of this disclosure.
Figure 10:
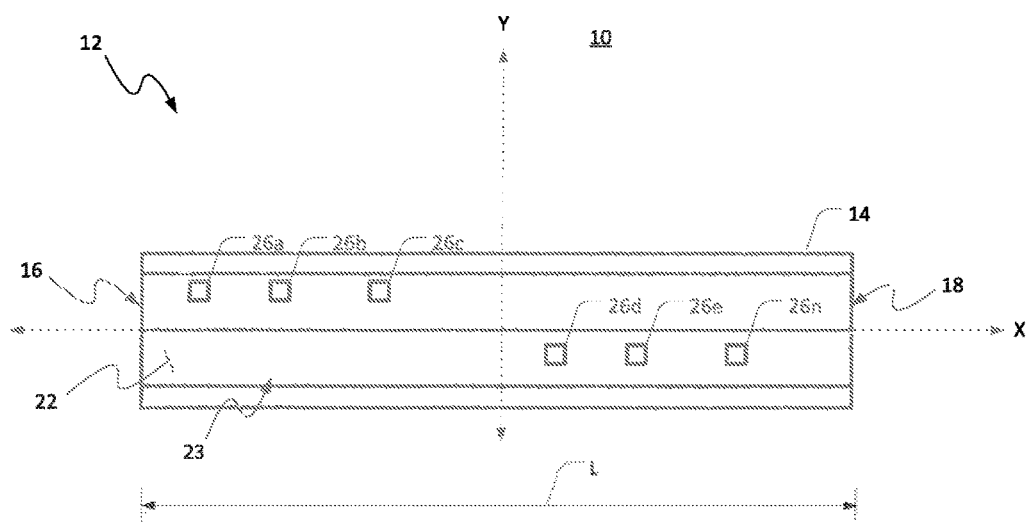
FIG. 10 is front view of the rear fog lamp of FIG. 9.

Turning now to FIGS. 9-10, another embodiment of the automotive lamp 10 is generally illustrated which may be particularly suited for use as a rear fog lamp. In particular, FIG. 9 is a perspective view of a rear fog lamp 12 and FIG. 10 is front view of the rear fog lamp 12. The rear fog lamp 12 of FIGS. 9-10 may be used to replace one of the two lamps 12, e.g., shown in FIGS. 7-8. The automotive lamp 10 includes a lamp 12 having an elongated optical lens 14 similar to FIGS. 1-8 described above. Whereas the lamp 12 of FIGS. 1-8 may include two or more LEDs, the lamp 12 of FIGS. 9-10 may include at least six LEDs 26a-n. The LEDs 26a-n may be configured to emit light in the visible red spectrum, and may be used with either a transparent clear or transparent red colored elongated lens 14. For example, simulations were performed using LEDs marketed under the tradename Synios P2720, KS DMLS31.23 ®, each operating at 100 lm and LEDs marketed under the tradename OSLON Black Flat, LA H9PP (both commercially available from OSRAM Opto Semiconductors Inc.).

The LEDs 26a-n may be arranged such that the principal emission axes of the generally Lambertian radiation pattern is parallel to the Z-axis. In addition, three LEDs (e.g., LEDs 26a, 26b, 26c) may be arranged above the XZ plane (e.g., arranged linearly with respect to each other) and three LEDs (e.g., LEDs 26d, 26e, 26n) may be arranged below the XZ plane (e.g., arranged linearly with respect to each other). It should be appreciated that while three LEDs (e.g., LEDs 26a, 26b, 26c) are shown on one side of the YZ plane and three LEDs (e.g., LEDs 26d, 26e, 26n) are shown on the other side of the YZ plane, this is not a limitation of the present disclosure unless specifically claimed as such, and that the LEDs 26a-n may be arranged in any pattern provided that three LEDs are above the XZ plane and three LEDs are below the XZ plane. The aspherical surface 23 of the emission side 22 may be configured such that the resulting illumination pattern of the lamp 12 complies with the necessary regulations such as, but not limited to, ECE Regulation No. 38-00 entitled "Uniform Provisions Concerning the Approval of: Rear Fog Lamps for Power-driven Vehicles and their Trailers" issued by the United Nations Economic Commission for Europe (UN-ECE), published by InterRegs (website interregs.com).

Figure 11:
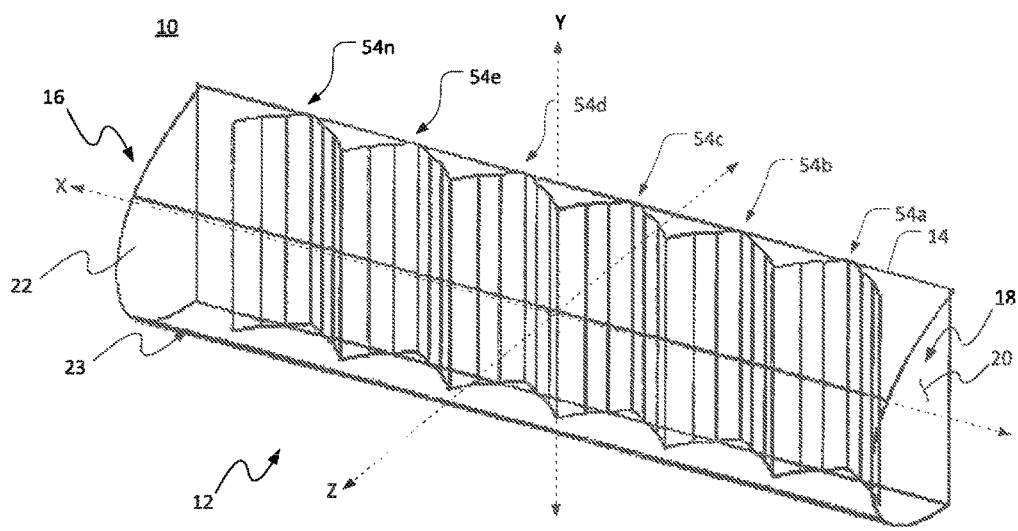
FIG. 11 is a perspective view of another embodiment of a rear fog lamp consistent with the present disclosure.
Figure 12:
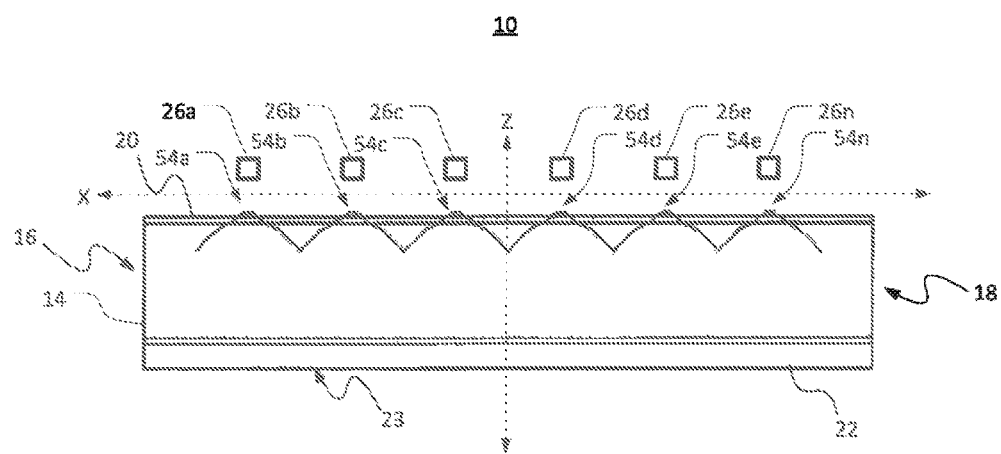
FIG. 12 is a top view of the rear fog lamp of FIG. 11.
Figure 13:
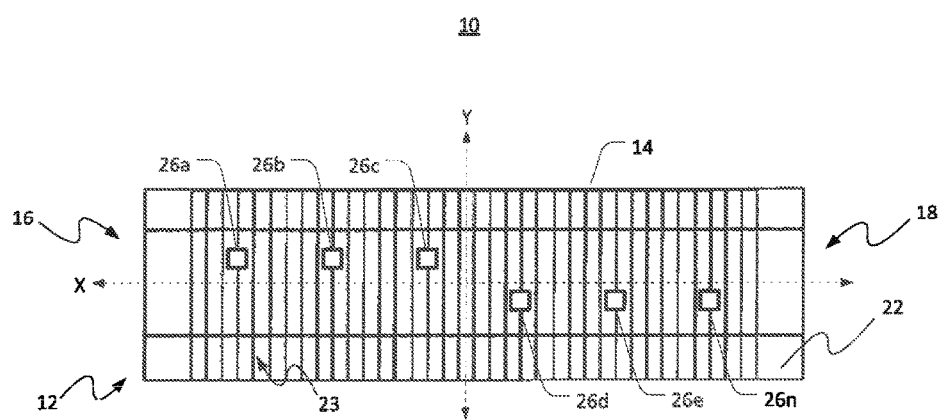
FIG. 13 is a front view of the rear fog lamp of FIG. 11.
Figure 14:
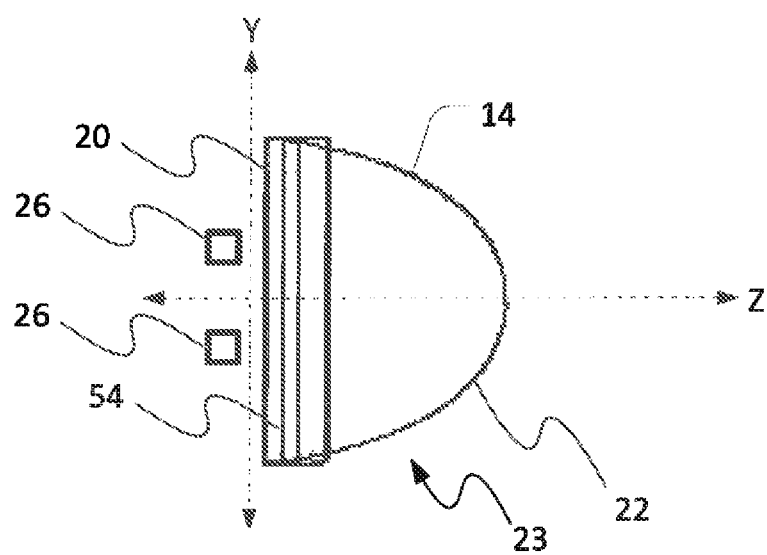
FIG. 14 is a side view of the rear fog lamp of FIG. 11.

Turning now to FIGS. 11-14, another embodiment of the rear fog lamp 12 is generally illustrated. In particular, FIG. 11 is a perspective view of the rear fog lamp 12 (shown without the plurality of LEDs 26a-n for clarity), FIG. 12 is a top view of the rear fog lamp 12, FIG. 13 is a front view of the rear fog lamp 12, and FIG. 14 is a side view of the rear fog lamp 12. The rear fog lamp 12 of FIGS. 11-14 may be similar to the rear fog lamp 12 of FIGS. 9-10, except that the source side 20 of the elongated optical lens 14 comprises a plurality of vertical flutes 54a-n (best seen in FIG. 12). Each vertical flute 54 of the plurality of vertical flutes 54a-n corresponds to a respective LED 26a-n of the plurality of LEDs 26a-n. In particular, each LED 26a-n may be arranged such that its principal emission axis is aligned with a center of the corresponding vertical flute 54a-n. The shape (e.g., contour) of the vertical flutes 54a-n make the elongated lens 14 more efficient by collecting more light and may be used to control/adjust the horizontal spread (e.g., in the XZ plane) of the light emitted by the rear fog lamp 12.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith. It is pointed out that this abstract is being provided to comply with the rule requiring an abstract that will allow examiners and other searchers to quickly ascertain the general subject matter of the technical disclosure. It is submitted with the understanding that it will not be used to interpret or limit the scope or meaning of the claims, as set forth in the rules of the U.S. Patent and Trademark Office.

The following non-limiting reference numerals are used in the specification:
10 automotive lamp;
12 lamp;
14 elongated optical lens;
16 first end surface;
18 second end surface;
19 end cap;
20 source side;
22 emission side;
23 aspherical surface;
24 illumination area;
26 LEDs;
27 ray trace;
29 plane;
31 upper edge;
33 lower edge;
35 first distance;
37 second end;
41 principal emission axis;
43 principal emission axis;
45 principal emission axis;
51 license plate;
52 backup camera;
53 left brake light;
54 vertical flutes;
55 right brake light;
57 center brake light;
FS focus line segment;
V vehicle;
G horizontal ground;
CL vehicle centerline;
L length;
T thickness;
H height;
W distance.

I claim:

1. An automotive lamp (10) comprising:
a first lamp (12) comprising:
an elongated optical lens (14) comprising a light transmissive material, a first end surface (16), a second end surface (18), a source side (20) extending between the first end surface (16) and the second end surface (18), and an emission side (22) having an aspherical surface (23) extending between the first end surface (16) and the second end surface (18) and facing an area to be illuminated (24), wherein the elongated optical lens (14) further comprises a length (L) extending between the first end surface (16) and the second end surface (18) which is parallel to a first horizontal X-axis, a thickness (T) in a second horizontal Z-axis, and a height (H) in a vertical Y-axis, the X-axis being orthogonal to the Z-axis and the Y-axis being orthogonal to both the X-axis and the Z-axis, wherein the length (L) of the elongated optical lens (14) is greater than both the thickness (T) and the height (H) of the elongated optical lens (14) and wherein the elongated optical lens (14) is configured to define a focus line segment (FS) extending parallel to the X-axis; and
a plurality of light emitting diodes (LEDs) (26a-n) facing the source side (20) and spaced longitudinally along the source side (20);
wherein the elongated optical lens (14) is configured to bend at least a portion of light emitted by the plurality of LEDs (26a-n) at an angle greater than 90 degrees below an XZ plane defined by the X-axis and Z-axis.

2. The automotive lamp (10) of claim 1, wherein each of the plurality of LEDs (26a-n) is configured to emit light in a generally Lambertian emission pattern.

3. The automotive lamp (10) of claim 1, wherein each of the plurality of LEDs (26a-n) is separated from source side (20) by air.

4. The automotive lamp (10) of claim 1, wherein the plurality of LEDs (26a-n) comprises a first LED (30) proximate the first end (16) of the elongated optical lens (14) and a second LED (32) proximate the second end (18) of the elongated optical lens (14), and a third LED (34) disposed between the first and the second LED (30, 32).

5. The automotive lamp (10) of claim 4, wherein the first, the second, and the third LED (30, 32, 34) are disposed at different positions along the Y-axis of the first lamp (12).

6. The automotive lamp (10) of claim 5, wherein the first and the second LED (30, 32) are disposed above an XZ plane (XZ) defined by the X-axis and Z-axis.

7. The automotive lamp (10) of claim 4, wherein the first and the second LED (30, 32) are disposed along the Z-axis of the first lamp (12) at a first distance from the focus line segment (FS), and wherein the third LED (34) is disposed along the Z-axis at a second distance from the focus line segment (FS), and wherein the second distance is different than the first distance.

8. The automotive lamp (10) of claim 7, wherein the third LED (36) is positioned closer to the focus line segment (FS) than the first and the second LED (30, 32).

9. The automotive lamp (10) of claim 4, wherein a principal emission axis of the generally Lambertian radiation pattern (C) of each of the first and the second LEDs (30, 32) is directed at a downward angle relative to the Z-axis of the first lamp (12).

10. The automotive lamp (10) of claim 9, wherein a principal emission axis of the generally Lambertian radiation pattern (C) of the third LED (36) is disposed parallel to the Z-axis.

11. The automotive lamp (10) of claim 1, wherein the elongated optical lens (14) comprises a material having a refractive index (n) in the range of 1.4 to 1.6.

12. The automotive lamp (10) of claim 1, wherein the first lamp (12) is configured to provide a ground illumination along a horizontal ground (G) of at least 1 lux at a distance from 0 m to 6 m from the first lamp (12) when the first lamp (12) is mounted to a vehicle (V) standing on the horizontal ground (G) at a mounting height from the horizontal ground (G) in the range of 371 mm to 1200 mm.

13. The automotive lamp (10) of claim 12, further comprising a second lamp (38), the second lamp (12) comprising:
  a second elongated optical lens (14) comprising a second source side (20) and a second emission side (22) having a second aspherical surface (23) facing the area to be illuminated (24), wherein the second elongated optical lens (14) further comprises a second length (L) extending between two opposite end surfaces (16, 18) which is parallel to the X-axis, a second thickness (T) in second Z-axis, and a second height (H) in the Y-axis, wherein the second elongated optical lens (14) comprises a light transmissive material and the second length (L) is greater than both the second thickness (T) and the second height (H) of the second elongated optical lens (14); and
  a second plurality of LEDs (26a-n) facing the second source side (20) and spaced longitudinally along the second source side (20);
  wherein the second lamp (12) is configured to provide ground illumination of at least 1 lux from 0 m to 6 m from the second lamp (12) when the second lamp (12) is mounted to the vehicle (V) at a mounting height in the range of 371 mm to 1200 mm; and
  wherein the first (12) and the second lamp (12) are configured to provide ground illumination along the horizontal ground (G) at a distance of at least 6 m total width on the horizontal ground (G) when the first and second lamp (12) are each mounted to the vehicle (V) standing on the horizontal ground (G) at a spacing of 1,750 mm from each other.

14. The automotive lamp (10) of claim 1, further comprising a video camera (52), wherein the first lamp (12) and the video camera (52) are configured to be mounted to a rear of a vehicle (V) standing on a horizontal ground (G), and wherein the area to be illuminated (24) is on the horizontal ground (G) behind the vehicle (V) and includes at least a portion of a field of view (FV) of the video camera (52).

15. The automotive lamp (10) of claim 1, wherein the source side (20) of the elongated optical lens (14) comprises a plurality of vertical flutes (54), each vertical flute (54) of the plurality of vertical flutes (54) corresponding to a respective LED (26a-n) of the plurality of LEDs (26a-n).

16. An automotive lamp (10) comprising:
  a first lamp (12) comprising:
    an elongated optical lens (14) comprising a light transmissive material, a first end surface (16), a second end surface (18), a source side (20) extending between the first end surface (16) and the second end surface (18), and an emission side (22) having an aspherical surface (23) extending between the first end surface (16) and the second end surface (18) and facing an area to be illuminated (24), wherein the elongated optical lens (14) further comprises a length (L) extending between the first end surface (16) and the second end surface (18) which is parallel to a first horizontal X-axis, a thickness (T) in a second horizontal Z-axis, and a height (H) in a vertical Y-axis, the X-axis being orthogonal to the Z-axis and the Y-axis being orthogonal to both the X-axis and the Z-axis, wherein the length (L) of the elongated optical lens (14) is greater than both the thickness (T) and the height (H) of the elongated optical lens (14) and wherein the elongated optical lens (14) is configured to define a focus line segment (FS) extending parallel to the X-axis; and
    a plurality of light emitting diodes (LEDs) (26a-n) facing the source side (20) and spaced longitudinally along the source side (20);
  wherein the elongated optical lens (14) is configured to bend at least a portion of light emitted by the plurality of LEDs (26a-n) below an XZ plane defined by the X-axis and Z-axis towards the Y-axis.

17. The automotive lamp (10) of claim 16, wherein the plurality of LEDs (26a-n) comprises a first LED (30) proximate the first end (16) of the elongated optical lens (14) and a second LED (32) proximate the second end (18) of the elongated optical lens (14), and a third LED (34) disposed between the first and the second LED (30, 32).

18. The automotive lamp (10) of claim 17, wherein the first, the second, and the third LED (30, 32, 34) are disposed at different positions along the Y-axis of the first lamp (12).

19. An automotive lamp (10) comprising:
  a first lamp (12) comprising:
    an elongated optical lens (14) comprising a light transmissive material, a first end surface (16), a second end surface (18), a source side (20) extending between the first end surface (16) and the second end surface (18), and an emission side (22) having an aspherical surface (23) extending between the first end surface (16) and the second end surface (18) and facing an area to be illuminated (24), wherein the elongated optical lens (14) further comprises a length (L) extending between the first end surface (16) and the second end surface (18) which is parallel to a first horizontal X-axis, a thickness (T) in a second horizontal Z-axis, and a height (H) in a vertical Y-axis, the X-axis being orthogonal to the Z-axis and the Y-axis being orthogonal to both the X-axis and the Z-axis, wherein the length (L) of the elongated optical lens (14) is greater than both the thickness (T) and the height (H) of the elongated optical lens (14) and wherein the elongated optical lens (14) is configured to define a focus line segment (FS) extending parallel to the X-axis; and a plurality of light emitting diodes (LEDs) (26*a-n*) facing the source side (20) and spaced longitudinally along the source side (20);

wherein the elongated optical lens (14) is configured to bend at least a portion of light emitted by the plurality of LEDs (26*a-n*) downward towards a plane parallel to the Y-axis and defined by an upper and a lower edge of the source side (20).

20. The automotive lamp (10) of claim 19, wherein the plurality of LEDs (26*a-n*) comprises a first LED (30) proximate the first end (16) of the elongated optical lens (14) and a second LED (32) proximate the second end (18) of the elongated optical lens (14), and a third LED (34) disposed between the first and the second LED (30, 32), and wherein the first, the second, and the third LED (30, 32, 34) are disposed at different positions along the Y-axis of the first lamp (12).

* * * * *